US007727135B2

(12) United States Patent
Urano et al.

(10) Patent No.: US 7,727,135 B2

(45) Date of Patent: Jun. 1, 2010

(54) CONDUCTIVE RUBBER ROLLER

(75) Inventors: Ryuta Urano, Ushiku (JP); Erika Umeki, Ushiku (JP); Naoki Koyama, Ushiku (JP)

(73) Assignee: Canon Kasei Kabushiki Kaisha, Ibaraki-ken (JP)

( * ) Notice: Subject to any disclaimer, the term of this patent is extended or adjusted under 35 U.S.C. 154(b) by 1063 days.

(21) Appl. No.: 11/417,171

(22) Filed: May 4, 2006

(65) Prior Publication Data

US 2006/0252620 A1 Nov. 9, 2006

(30) Foreign Application Priority Data

| | | | |
|---|---|---|---|
| May 9, 2005 | (JP) | ............................. | 2005-136055 |
| May 9, 2005 | (JP) | ............................. | 2005-136056 |
| May 9, 2005 | (JP) | ............................. | 2005-136057 |
| May 9, 2005 | (JP) | ............................. | 2005-136058 |
| May 9, 2005 | (JP) | ............................. | 2005-136059 |
| Apr. 18, 2006 | (JP) | ............................. | 2006-114434 |

(51) Int. Cl.
*F16C 13/00* (2006.01)

(52) U.S. Cl. ............................. 492/56; 492/18; 492/25; 428/36.8; 399/176

(58) Field of Classification Search ................... 492/56, 492/18, 25; 29/895.32, 895.3
See application file for complete search history.

(56) References Cited

U.S. PATENT DOCUMENTS

| | | | | |
|---|---|---|---|---|
| 6,648,807 | B2 * | 11/2003 | Hashimoto et al. ............ | 492/59 |
| 6,951,688 | B2 * | 10/2005 | Kato et al. .................. | 428/413 |
| 7,070,552 | B2 * | 7/2006 | Mizumoto ................... | 492/56 |
| 7,172,544 | B2 | 2/2007 | Ki et al. ........................ | 492/56 |
| 7,291,663 | B2 | 11/2007 | Hattori et al. ............... | 524/168 |
| 2003/0236330 | A1 | 12/2003 | Hattori et al. ............... | 524/155 |
| 2004/0096247 | A1 | 5/2004 | Ki et al. ...................... | 399/286 |
| 2006/0280928 | A1 | 12/2006 | Imasaka et al. .......... | 428/304.4 |

FOREIGN PATENT DOCUMENTS

| | | |
|---|---|---|
| JP | 2001-026203 | 1/2001 |
| JP | 2002-121376 | 4/2002 |
| JP | 2002-132020 | 5/2002 |
| JP | 2002-212413 | 7/2002 |
| JP | 2002-287456 | 10/2002 |
| JP | 2003-057902 | 2/2003 |
| JP | 2004-151534 | 5/2004 |
| JP | 2004-269618 | 9/2004 |
| JP | 2004-271709 | 9/2004 |
| JP | 2006-037042 | 2/2006 |
| KR | 2004-0002596 | 1/2004 |
| KR | 2004-0042878 | 5/2004 |

OTHER PUBLICATIONS

Notice of Allowance for JP 2007-049359744, published Sep. 12, 2007.

* cited by examiner

*Primary Examiner*—David P Bryant
*Assistant Examiner*—Sarang Afzali
(74) *Attorney, Agent, or Firm*—Fitzpatrick, Cella, Harper & Scinto

(57) ABSTRACT

A conductive rubber roller comprising a conductive core material and provided thereon a rubber layer; the rubber layer being formed by using a rubber composition containing as rubber components at least a polar rubber and an ethylene oxide-propylene oxide-allyl glycidyl ether terpolymer; the ethylene oxide-propylene oxide-allyl glycidyl ether terpolymer having a melt peak temperature of from 20 to 30° C. and a melt enthalpy change ΔH of from 40 to 70 mJ/mg as measured with a differential scanning calorimeter; and the allyl glycidyl ether in the ethylene oxide-propylene oxide-allyl glycidyl ether terpolymer being in a copolymerization ratio of from more than 10 mol % to 20 mol % or less.

7 Claims, No Drawings

CONDUCTIVE RUBBER ROLLER

BACKGROUND OF THE INVENTION

1. Field of the Invention

This invention relates to a conductive rubber roller used in image forming apparatus such as an electrophotographic copying apparatus, a printer and an electrostatic recording apparatus, and more particularly to a conductive rubber roller used as, e.g., a transfer roller of a transfer assembly by means of which a tansferable image based on a toner image is transferred to a recording medium such as paper; the toner image being formed and held on an image bearing member such as an electrostatic photosensitive member by an imaging means such as an electrophotographic process or an electrostatic recording process.

2. Related Background Art

In the image forming apparatus such as an electrophotographic copying apparatus and an electrostatic recording apparatus, a contact charging system is prevalent in which a conductive rubber roller to which a voltage is kept applied is pressed against the surface of an electrostatic photosensitive member to charge it electrostatically. Around the electrostatic photosensitive member (drum), which the heart of image formation, conductive rubber rollers are independently used in individual steps of charging, transfer and so forth.

In recent years, as rubber components of such conductive rubber rollers, polar rubbers such as acrylonitrile-butadiene rubber and epichlorohydrin type rubber are used. The polar rubbers have conductivity (ionic conductivity) because of the presence of a polar group in the polymer, and are known to be suitable for the conductive rubber rollers because of less scattering of electrical resistance and a small voltage dependence of the electrical resistance.

Elastic-material layers of the conductive rubber rollers are required to have a volume resistivity of $2\times10^9$ Ωcm or less in many cases. Where the rubber component is acrylonitrile-butadiene rubber alone, its vulcanized product has a volume resistivity of approximately from $2\times10^9$ to $1\times10^{10}$ Ωcm, resulting in an insufficient conductivity. Also, the acrylonitrile-butadiene rubber has an inferior ozone resistance, and hence no sufficient electrification durability is achievable.

Accordingly, a method is commonly used in which an epichlorohydrin type rubber, which is known to have a volume resistivity of approximately from $1\times10^7$ to $3\times10^9$ Ωcm, is blended with the acrylonitrile-butadiene rubber to make control so that the desired volume resistivity can be achieved (see, e.g., Japanese Patent No. 3656904).

Also in recent years, conductive rubber rollers having lower electrical resistance are required in order to make adaptation to color image formation and high-quality image formation, and a method is also used in which the epichlorohydrin type rubber is used alone or an ionic conducting agent of various types such as a quaternary ammonium salt which contains perchlorate ions or chloride ions is added (see, e.g., Japanese Patent Application Laid-open No. 2002-132020).

However, in the case of the conductive rubber rollers making use of such a rubber elastic material, their resistivity may change depending on variations of environmental factors such as temperature and humidity, and hence there is a problem that the image quality changes depending on service environment. In particular, the epichlorohydrin type rubber has problems that it tends to be influenced by humidity to greatly cause environmental variations of resistivity. The method in which an ionic conducting agent of various types such as a quaternary ammonium salt is added also has a possibility of causing changes with time of resistivity because of contamination, electrification or the like due to surface migration of ions. Hence, any electrification durability adaptable to high-speed and long-lifetime image formation can not be achieved in some cases.

In the case when the epichlorohydrin type rubber and the quaternary ammonium salt which contains perchlorate ions or chloride ions are mixed, there are also possibilities of making compression set occur very seriously and besides causing poisonous gas and dioxin at the time of incineration, for the reasons that, e.g., the chlorine causes side reaction.

Accordingly, as a method by which the problems as stated above can be resolved, a method is variously attempted in which an ethylene oxide-propylene oxide-allyl glycidyl ether terpolymer is mixed in a stated quantity in the polar rubber such as acrylonitrile-butadiene rubber or epichlorohydrin rubber. The ethylene oxide-propylene oxide-allyl glycidyl ether terpolymer contains ether-oxygen linkages and hence has the function to stabilize metallic cations and the like in the polymer to lower electrical resistance. The ethylene oxide-propylene oxide-allyl glycidyl ether terpolymer can also cross-link with other rubbers because it has a large polarity and a superior compatibility with other polar rubbers and also because the allyl glycidyl ether has unsaturated bonds. This can not easily cause bleeding and electrostatic photosensitive member contamination as being different from conducting agents such as quaternary ammonium salts. Also, the ethylene oxide-propylene oxide-allyl glycidyl ether terpolymer contains no halogen element, and hence it is reported that it has no problem of the side reaction of chlorine the epichlorohydrin type rubber may cause and good rubber materials can be obtained which are well preventive of compression set (see, e.g., Japanese Patent Application Laid-open No. 2002-105305).

It is also reported that an ethylene oxide-propylene oxide-allyl glycidyl ether terpolymer having a specific copolymerization ratio is mixed in a stated quantity to thereby obtain a conductive rubber roller having a lower electrical resistance and having a good ozone resistance and a smaller environmental dependence than the conductive rubber roller making use of a rubber composition comprising a blend of acrylonitrile-butadiene rubber and epichlorohydrin type rubber and the conductive rubber roller making use of a rubber composition to which an ionic conducting agent is added, having been conventionally used (see, e.g., Japanese Patent No. 3600517 and Japanese Patent Application Laid-open No. 2006-037042).

In the case of the rubber composition disclosed in Japanese Patent No. 3600517, a conductive rubber roller having a superior ozone resistance can be obtained. However, further improvement has been sought in regard to the achievement of low electrical resistance, the environmental dependence and the anti-contamination to photosensitive member. In the case of the rubber composition disclosed in Japanese Patent Application Laid-open No. 2006-037042, a conductive rubber roller having a small environmental dependence can be obtained. However, it is difficult in some cases to achieve the low electrical resistance and the small environmental dependence, and further improvement has been sought.

SUMMARY OF THE INVENTION

An object of the present invention is to solve the problems discussed above, and provide, in conductive rubber rollers such as a transfer roller, a charging roller and a developing roller which make use of the polar rubber such as acrylonitrile-butadiene rubber and epichlorohydrin type rubber, a conductive rubber roller which has a low electrical resistance, also has a small level of variations in roller resistivity that are due to deterioration of electrification durability and environmental changes and still also has kept the electrostatic photosensitive member contamination from occurring.

Then, as a result of extensive studies made repeatedly in order to resolve the above problems, the present inventors have discovered that the use of an ethylene oxide-propylene oxide-allyl glycidyl ether terpolymer which has melt peak temperature and melt enthalpy change ΔH in specific ranges as measured with a differential scanning calorimeter and in which the allyl glycidyl ether has been copolymerized in a specific copolymerization ratio can give a conductive rubber roller which is less causative of environmental variations of resistivity, also has a low resistivity and has kept the electrostatic photosensitive member contamination from occurring while retaining a good electrification durability secured in conventional cases.

The present invention has been accomplished on the basis of such a finding.

That is, according to the present invention, a conductive rubber roller is provided which is a conductive rubber roller comprising a conductive core material and provided thereon a rubber layer;

the rubber layer being formed by using a rubber composition containing as rubber components at least a polar rubber and an ethylene oxide-propylene oxide-allyl glycidyl ether terpolymer;

the ethylene oxide-propylene oxide-allyl glycidyl ether terpolymer having a melt peak temperature of 20° C. or higher and 30° C. or lower and a melt enthalpy change ΔH of 40 mJ/mg or more and 70 mJ/mg or less as measured with a differential scanning calorimeter, and the allyl glycidyl ether in the ethylene oxide-propylene oxide-allyl glycidyl ether terpolymer being in a copolymerization ratio of from more than 10 mol % to 20 mol % or less.

According to the present invention, a conductive rubber roller is also provided which is the above conductive rubber roller, in which, where the copolymerization ratios of the propylene oxide and allyl glycidyl ether in the ethylene oxide-propylene oxide-allyl glycidyl ether terpolymer are represented by a and b (mol %), respectively, $10<a+b\leqq 30$ $(10<b\leqq 20)$.

A conductive rubber roller is still also provided which is the above conductive rubber roller, in which the above rubber composition further contains an ionic conducting agent in an amount of 0.1 part by mass or more and 10 parts by mass or less based on 100 parts by mass of the rubber components.

A conductive rubber roller is further provided which is any of the above conductive rubber rollers, which comprises the above rubber composition, which contains, based on 100 parts by mass of the total sum of the rubber components of the rubber composition, 5 parts by mass or more and 70 parts by mass or less of carbon black having an iodine adsorption of 5 mg/m or more and 30 mg/g or less and a dibutyl phthalate (DBP) oil absorption of 55 ml/100 g or less.

A conductive rubber roller is further provided which is any of the above conductive rubber rollers, in which the ethylene oxide-propylene oxide-allyl glycidyl ether terpolymer is mixed in an amount of 5 parts by mass or more and 20 parts by mass or less based on 100 parts by mass of the total sum of the rubber components of the rubber composition.

A conductive rubber roller is herein further provided which is any of the above conductive rubber rollers, in which the polar rubber is any one, or both, of acrylonitrile-butadiene rubber and epichlorohydrin rubber.

A conductive rubber roller is further provided which is any of the above conductive rubber rollers, used in an image forming apparatus in which an electrostatic latent image formed on an electrostatic photosensitive member is developed with a developer, in which the conductive rubber roller is a transfer roller which is face to face disposed on the electrostatic photosensitive member.

DETAILED DESCRIPTION OF THE PREFERRED EMBODIMENTS

As stated above, the conductive rubber roller of the present invention is a conductive rubber roller having a small environmental dependence of resistivity, also having a superior electrification durability, having a low resistivity and having kept electrostatic photosensitive member contamination from occurring. Hence, the conductive rubber roller of the present invention is suited for a transfer roller of a transfer assembly by means of which a transferable image based on a toner image is transferred to a recording medium such as paper; the toner image being formed and held on an image bearing member such as an electrostatic photosensitive member by an imaging means such as an electrophotographic process or an electrostatic recording process.

The conductive rubber roller of the present invention is described below in detail.

The conductive rubber roller of the present invention is basically constituted of a conductive core material and a rubber layer provided thereon as an elastic-material layer.

The elastic-material layer (rubber layer) used in the present invention is constituted of a rubber composition containing as rubber components at least a polar rubber and an ethylene oxide-propylene oxide-allyl glycidyl ether terpolymer.

The development of conductivity that is due to the ethylene oxide-propylene oxide-allyl glycidyl ether terpolymer attributes to the fact that oxonium ions or metal cations in a polymer which have coordinated with the ethylene oxide unit move continuously along the segment movement of molecular chains while changing those with which they are to coordinate. Thus, those having the ethylene oxide unit in a higher ratio can coordinate with more ions to come stable, and enable achievement of low electrical resistance. However, if the ethylene oxide unit is in an excessively high ratio, the crystallization of ethylene oxide takes place to make the segment movement of molecular chains inhibited, conversely resulting in a high volume resistivity. Accordingly, propylene oxide is copolymerized with ethylene oxide so that the ethylene oxide unit can appropriately be provided with randomness to keep the crystallization from taking place. Their copolymerization with allyl glycidyl ether also enables cross-link with other rubbers, and this makes it possible to lessen the bleeding and the electrostatic photosensitive member contamination. Incidentally, the allyl glycidyl ether unit also has the function to keep the ethylene oxide from crystallizing, like the propylene oxide, to contribute to the achievement of low electrical resistance.

In the ethylene oxide-propylene oxide-allyl glycidyl ether terpolymer used in the present invention, it is essential that it has a melt peak temperature of 20° C. or higher and 30° C. or lower and a melt enthalpy change ΔH of 40 mJ/mg or more and 70 mJ/mg or less as measured with a differential scanning calorimeter and that the allyl glycidyl ether is in a copolymerization ratio of from more than 10 mol % to 20 mol % or less, and preferably 11 mol % or more and 15 mol % or less.

Incidentally, the melt peak temperature and melt enthalpy change ΔH measured with a differential scanning calorimeter are used as indexes of the crystallizability of a polymeric compound.

Thus, if the melt peak temperature is more than 30° C. and the melt enthalpy change ΔH is more than 70 mJ/mg, the propylene oxide and allyl glycidyl ether may insufficiently make the ethylene oxide kept from crystallizing, so that the segment movement of molecular chains may be inhibited to enable no achievement of low electrical resistance.

If on the other hand the melt peak temperature is less than 20° C. and the melt enthalpy change ΔH is less than 40 mJ/mg, the propylene oxide and allyl glycidyl ether may sufficiently make the ethylene oxide kept from crystallizing, but the achievement of low electrical resistance is not expectable, and besides molecular chains of the ethylene oxide-propylene oxide-allyl glycidyl ether terpolymer in the vulcanized rubber may have so excessively high a degree of freedom as to give no sufficiently small environmental dependence especially in a high-temperature and high-humidity environment.

If the allyl glycidyl ether is in a copolymerization ratio of 10 mol % or less even though the melt peak temperature and melt enthalpy change ΔH measured with a differential scanning calorimeter are within the above ranges, a conductive rubber roller having a superior electrification durability may be obtained but, because of few cross-linking sites, there is a possibility of bleeding or surface migration, and besides molecular chains of the ethylene oxide-propylene oxide-allyl glycidyl ether terpolymer in the vulcanized rubber may have so excessively high a degree of freedom as to give no sufficiently small environmental dependence especially in a high-temperature and high-humidity environment to bring about a possibility of causing changes in image quality depending on service environment. A problem may also arise such that, where an ionic conducting agent is added, it bleeds to contaminate the electrostatic photosensitive member. If on the other hand the allyl glycidyl ether is in a copolymerization ratio of more than 20 mol % of the above range, a conductive rubber roller having a small environmental dependence of resistivity and good anti-contamination to photosensitive member may be obtained, but, because of conversely too many cross-linking sites, the degree of freedom of the ethylene oxide-propylene oxide-allyl glycidyl ether terpolymer may be damaged to make the achievement of low electrical resistance difficult and besides resulting in poor tensile properties, fatigue properties, flexing resistance and so forth, or resulting in a too high hardness of the cross-linked product.

Incidentally, from the viewpoint of compatibility, electrical resistance value and so forth, the ethylene oxide and propylene oxide of the ethylene oxide-propylene oxide-allyl glycidyl ether terpolymer used in the present invention may preferably be in a copolymerization ratio of, where the copolymerization ratios of the propylene oxide and allyl glycidyl ether in the ethylene oxide-propylene oxide-allyl glycidyl ether terpolymer are represented by a and b (mol %), respectively, it is preferable to be $10<a+b\leqq 30$ $(10<b\leqq 20)$.

From the viewpoint of prevention of bleeding and prevention of electrostatic photosensitive member contamination, the ethylene oxide-propylene oxide-allyl glycidyl ether terpolymer may also have a molecular weight of 10,000 or more as number average molecular weight, the range of which is proper up to the molecular weight that enables the terpolymer to be kneaded at usual kneading temperature.

The ethylene oxide-propylene oxide-allyl glycidyl ether terpolymer used in the present invention may also preferably be mixed in an amount of 5 parts by mass or more and 20 parts by mass or less based on 100 parts by mass of the total mass of the rubber components. If it is mixed in an amount of less than 5 parts by mass, it is difficult to well obtain the effect of achievement of low electrical resistance and high durability that is due to the ethylene oxide-propylene oxide-allyl glycidyl ether terpolymer. If it is mixed in an amount of more than 20 parts by mass, it tends to make the rubber roller have a large environmental dependence of electrical resistance, and besides there is a possibility of contaminating the electrostatic photosensitive member.

In the present invention, an ionic conducting agent may preferably be added in order to enhance the concentration of ion carriers in the rubber to achieve the low electrical resistance. The ionic conducting agent may more preferably be added in an amount of 0.1 part by mass or more and 10 parts by mass or less based on 100 parts by mass of the binder resin. If it is in an amount of less than 0.1 part by mass, the effect of providing ionic conductivity may be not obtainable. Even if it is in an amount of more than 10 parts by mass, the effect on ionic conductivity more than that may no longer be expected, and also there is a possibility that it bleeds out to the roller surface to cause the contamination of the electrostatic photosensitive member.

Incidentally, the allyl glycidyl ether in the ethylene oxide-propylene oxide-allyl glycidyl ether terpolymer has unsaturated bonds, and enables cross-link with other rubbers. Hence, a difference in copolymerization ratio of the allyl glycidyl ether changes the bleeding properties of the ionic conducting agent.

If the allyl glycidyl ether is in a copolymerization ratio of less than 10 mol % of the range in the present invention, there is a possibility of bleeding or surface migration because of few cross-linking sites with rubber materials. If on the other hand the the allyl glycidyl ether is in a copolymerization ratio of more than 20 mol % of the range in the present invention, a sufficient effect is obtainable against the bleeding and surface migration of the ionic conducting agent, but, because of many sites of cross-linking with other rubber materials, the degree of freedom of molecular chains may be damaged to affect the stabilization of ions to inhibit the achievement of low electrical resistance, also resulting in a too high hardness of the cross-linked product.

As the ionic conducting agent, any of conventionally known various conducting agents may be used. In particular, it is preferable to use at least one of a quaternary ammonium salt and a quaternary phosphonium salt. Also, in the case of an ionic conducting agent containing a halogen component, there is a possibility that the polymer and the halogen component cause side reaction, and there is a possibility of affecting rubber physical properties because of, e.g., compression set coming seriously. Accordingly, the quaternary ammonium salt and quaternary phosphonium salt used in the present invention may more preferably be non-halogen compounds.

The rubber composition used in the present invention may preferably be a vulcanized product of a rubber composition containing, based on 100 parts by mass of the rubber components, 5 parts by mass or more and 70 parts by mass or less of carbon black as a filler, having an iodine adsorption of 5 mg/g or more and 30 mg/g or less and a dibutyl phthalate (DBP) oil absorption of 55 ml/100 g or less.

In the conductive rubber roller of the present invention, the use of only the carbon black as a filler enables the rubber composition to have a low moisture absorption and enables the resultant conductive rubber roller to have a small environmental dependence of electrical resistance. Incidentally, the iodine adsorption is used as an index of particle diameter of the carbon black. Having the iodine adsorption in the range of from 5 to 30 mg/g means that the carbon black has a relatively large particle diameter. Also, the dibutyl phthalate (DBP) oil absorption is used as an index of size of structure (connection of carbon black particles). Having the dibutyl phthalate (DBP) oil absorption of 55 ml/100 g or less means that the structure little comes on or has relatively not grown.

If the carbon black has an iodine adsorption of more than 30 mg/g or a dibutyl phthalate (DBP) oil absorption of more than 55 ml/100 g, the carbon black tends to reach the percolation limit in its addition in a small quantity to have a high possibility of showing conductivity by an electron conduction mechanism. In the case of an electron conduction system, there is an advantage that the environmental dependence of electrical resistance is small. However, there is a problem that the resistivity comes non-uniform and voltage dependence of electrical resistance comes about, and this is undesirable for the conductive rubber roller. If on the other hand the carbon black has an iodine adsorption of less than 5 mg/g, it must be added in a large quantity in order to provide the elastic material with a stated hardness, resulting in an inferior kneading processability.

The carbon black having an iodine adsorption of 5 mg/g or more and 30 mg/g or less and a dibutyl phthalate (DBP) oil absorption of 55 ml/100 g or less may also be added in an amount ranging from 5 to 70 parts by mass based on 100 parts by mass of the rubber components. If it is added in an amount of less than 5 parts by mass, the effect as a filler may be so insufficient as to make the resultant vulcanized rubber have a low strength, so that the vulcanized rubber may break or sever when the conductive core material is inserted. If on the other hand the carbon black is added in an amount of more than 70 parts by mass, there is a possibility that the electron conduction takes place even with use of the carbon black, and besides the rubber may have a too high hardness, undesirably. Incidentally, the carbon black may more preferably be added in an amount of 5 parts by mass or more and 30 parts by mass or less, where a conductive rubber roller can be obtained which promises a smaller level of variations in roller resistivity which are due to environmental changes and deterioration of electrification durability.

The rubber composition used in the present invention contains as rubber components the ethylene oxide-propylene oxide-allyl glycidyl ether terpolymer and, in addition thereto, at least one polar rubber. It may preferably contain as the polar rubber at least one of an epichlorohydrin type rubber and acrylonitrile-butadiene rubber. There are no particular limitations on the epichlorohydrin type rubber. Commercially available are an epichlorohydrin homopolymer (ECH), an epichlorohydrin-ethylene oxide copolymer (ECH-EO), an epichlorohydrin-allyl glycidyl ether copolymer (ECH-AGE), an epichlorohydrin-ethylene oxide-allyl glycidyl ether terpolymer (ECH-EO-AGE) and so forth. In particular, the epichlorohydrin-ethylene oxide-allyl glycidyl ether terpolymer (ECH-EO-AGE), which is capable of sulfur vulcanization or effective vulcanization, is preferred, and it is more preferable that the ethylene oxide in the epichlorohydrin type rubber is in a copolymerization ratio of 40 mol % or more.

The epichlorohydrin-ethylene oxide-allyl glycidyl ether terpolymer shows a tendency that the volume resistivity of the vulcanized rubber decreases with an increase in the copolymerization ratio of the ethylene oxide. Hence, if the ethylene oxide is in a copolymerization ratio of less than 40 mol %, the electrical resistance value necessary for the elastic material of the conductive rubber roller may be achieved with difficulty, and also the epichlorohydrin rubber has so large mixing proportion to make the rubber have a high environmental dependence. More preferably, the ethylene oxide in the epichlorohydrin type rubber may be in a copolymerization ratio of 45 mol % or more and 80 mol % or less. Incidentally, the epichlorohydrin type rubber may be either a single material or a blend of two or more types.

There are also no particular limitations on the acrylonitrile-butadiene rubber used in the present invention. Any commercially available acrylonitrile-butadiene rubber may be used. In particular, an acrylonitrile-butadiene rubber having an average acrylonitrile content of 15% by mass or more and 25% by mass or less is preferred. If it has an average acrylonitrile content of less than 15% by mass, it is difficult to achieve the stated resistivity. If it has an average acrylonitrile content of more than 25% by mass, the rubber roller tends to have a large environmental dependence of electrical resistance. Incidentally, the acrylonitrile-butadiene rubber may be either a single material or a blend of two or more types.

The rubber composition used for the conductive rubber roller of the present invention may also optionally be incorporated with other components used in commonly available rubbers. For example, those which may optionally be mixed are a vulcanizing agent such as sulfur or an organic sulfur-containing compound, a vulcanization accelerator of various types, a processing aid such as a lubricant of various types or a factice, an antioxidant of various types, a blowing agent of various types such as p,p'-oxybis(benzenesulfonylhydrazide) (OBSH), azodicarbonamide (ADCA) or dinitrosopentamethylenetetramine (DPT), a blowing auxiliary agent of various types such as urea, a vulcanization auxiliary agent such as zinc oxide or stearic acid, and a filler of various types such as calcium carbonate, talc, silica or clay.

In the case of the present invention, inasmuch as the ethylene oxide-propylene oxide-allyl glycidyl ether terpolymer has the melt peak temperature and melt enthalpy change ΔH within the specific ranges as measured with a differential scanning calorimeter, the ions can more effectively be stabilized to enable achievement of low electrical resistance and lessen any changes in resistivity due to temperature and humidity. Further, the copolymerization of the allyl glycidyl ether in the specific ratio lessens any changes in electrical resistance (especially between a normal-temperature and normal-humidity environment and a high-temperature and high-humidity environment) due to changes in the movement of molecular chains in the vulcanized rubber, and further enables the photosensitive member contamination to be kept from occurring. Thus, this makes it possible to provide a conductive rubber roller having a low electrical resistance, promising a small change in electrical resistance due to temperature and humidity and having kept the photosensitive member contamination from occurring, while retaining the feature of high durability the conductive rubber roller has which contains the conventional ethylene oxide-propylene oxide-allyl glycidyl ether terpolymer.

As a production process, the conductive rubber roller of the present invention may be obtained by extruding an unvulcanized conductive rubber composition into a tube by means of an extruder, heating it in a vulcanizer or a continuous vulcanizing furnace to prepare a conductive rubber (elastic material) tube, and thereafter inserting to this conductive rubber tube a conductive shaft coated with an adhesive, followed by heating to bond the conductive shaft and the conductive rubber tube together, and further followed by grinding until the roller comes to have a stated diameter. Any conventionally known various production processes may also be used in which an unvulcanized conductive rubber composition and a conductive shaft coated with an adhesive are simultaneously extruded, or a rubber composition having been extruded is filled in a mold to effect vulcanization. Further, the conductive rubber roller of the present invention may also optionally be provided with a layer of a resin or the like on the outer periphery of the elastic-material layer.

As the conductive core material used as a conductive shaft of the conductive rubber roller of the present invention, a round rod of a metallic material such as iron, copper or stainless steel may be used, which may preferably have an outer diameter of from 4 to 10 mm. The surface of such a rod may further be treated by plating, for the purposes of rust prevention and providing scratch resistance.

The conductive rubber roller of the present invention is used in an image forming apparatus in which an electrostatic latent image formed on an electrostatic photosensitive member is developed with a developer, and the conductive rubber roller may preferably be a transfer roller which is face to face disposed on the electrostatic photosensitive member.

EXAMPLES

The present invention is described below in greater detail by giving Examples and Comparative Examples. The present invention is by no means limited to these Examples.

Formulation proportions of rubber compositions used in Examples and Comparative Examples and test results on conductive rubber rollers obtained are as shown in Tables 1 to 5. In the formulation shown therein, the units of amount are parts by mass.

First, raw materials shown below were used in Examples and Comparative Examples under the formulation shown in Tables 1 to 5, and were kneaded by means of an open roll to prepare rubber compositions of Examples and Comparative Examples.

Ethylene oxide-propylene oxide-allyl glycidyl ether terpolymer (ethylene oxide-propylene oxide-allyl glycidyl ether copolymerization ratio (mol %): 87:1:12; number average molecular weight: 60,000; trade name: ZEOSPAN 8010, available from Nippon Zeon Co., Ltd.).

Ditto (ethylene oxide-propylene oxide-allyl glycidyl ether copolymerization ratio (mol %): 94:2:4; number average molecular weight: 80,000; a trial product).

Ditto (ethylene oxide-propylene oxide-allyl glycidyl ether copolymerization ratio (mol %): 77:0.5:22.5; number average molecular weight: 70,000; a trial product).

Ditto (ethylene oxide-propylene oxide-allyl glycidyl ether copolymerization ratio (mol %): 74:12:14; number average molecular weight: 70,000; a trial product).

Ditto (ethylene oxide-propylene oxide-allyl glycidyl ether copolymerization ratio (mol %): 89:0.5:10.5; number average molecular weight: 70,000; a trial product).

Ditto (ethylene oxide-propylene oxide-allyl glycidyl ether copolymerization ratio (mol %): 87:4:9; number average molecular weight: 80,000; a trial product).

Ditto (ethylene oxide-propylene oxide-allyl glycidyl ether copolymerization ratio (mol %): 90:4:6; number average molecular weight: 80,000; trade name: ZEOSPAN 8030, available from Nippon Zeon Co., Ltd.).

Acrylonitrile-butadiene rubber (acrylonitrile content: 18% by mass; trade name: NIPOL DN401L; available from Nippon Zeon Co., Ltd.).

Epichlorohydrin type rubber (ethylene oxide content: 56 mol %; trade name: ZECHRON 3106; available from Nippon Zeon Co., Ltd.).

Ionic conducting agent (quaternary ammonium salt, EO addition type quaternary ammonium salt; trade name: KS-555; available from Kao Corporation).

Carbon black (Carbon Black A; iodine adsorption: 14 mg/g; DBP oil absorption: 29 ml/100 g; trade name: ASAHI #8; available from Asahi Carbon Co., Ltd.).

Ditto (Carbon Black B; iodine adsorption: 23 mg/g; DBP oil absorption of 51 ml/100 g; trade name: ASAHI #35; available from Asahi Carbon Co., Ltd.).

Ditto (Carbon Black C; iodine adsorption: 25 mg/g; DBP oil absorption of 87 ml/100 g; trade name: ASAHI #55; available from Asahi Carbon Co., Ltd.).

Filler (calcium carbonate; trade name: SUPER 3S; available from Maruo Calcium Co., Ltd.).

Vulcanizing agent (sulfur, S; trade name: SULFAX PMC; available from Tsurumi Kagaku Kogyo K.K.).

Vulcanization accelerator (dibenzothiazyl disulfide, DM; trade name: NOCCELER DM; available from Ohuchi-Shinko Chemical Industrial Co., Ltd.).

Ditto (tetraethylthiuram disulfide, TET; trade name: NOCCELER TET; available from Ohuchi-Shinko Chemical Industrial Co., Ltd.).

Vulcanization auxiliary agent (zinc oxide; trade name: Zinc Oxide JIS 2, available from Hakusui Chemical Industries, Ltd.).

Ditto (stearic acid; trade name: LUNAC S20; available from Kao Corporation).

Blowing agent (azodicarbonamide; trade name: VINYFOR AC #LQ; available from Eiwa Chemical Ind. Co., Ltd.).

Blowing auxiliary agent (urea; trade name: CELLPASTE A; available from Eiwa Chemical Ind. Co., Ltd.).

To produce conductive rubber rollers of Examples and Comparative Examples, the rubber compositions were each extruded into a tube by using an extruder, followed by vulcanization at 160° C. for 30 minutes by means of a vulcanizer to prepare a tubular rubber vulcanized product, and then a conductive shaft of 6 mm in diameter was inserted to the inner-diameter part of the tubular rubber vulcanized product to obtain a roller-shaped form. This form was so ground as to have an outer diameter of 14 mm. Thus, the conductive rubber rollers were produced.

—Measurement of Melt Peak Temperature and Melt Enthalpy Change ΔH—

Using a differential scanning calorimeter (EXSTAR6000 DSC, manufactured by Seiko Instruments Inc.), about 10 mg of the ethylene oxide-propylene oxide-allyl glycidyl ether terpolymer was heated (heating rate: 10° C./min) in the temperature range of from −100° C. to +100° C., and this was repeatedly operated twice, where the melt peak temperature and melt enthalpy change ΔH (mJ/mg) of the ethylene oxide-propylene oxide-allyl glycidyl ether terpolymer were calculated from second-time melt peaks.

—Measurement of Roller Resistivity (Environmental Dependence)—

The conductive rubber rollers produced were each brought into pressure contact with a drum of 30 mm in outer diameter and made of aluminum, in such a way that a load of 4.9 N each was applied to the both end portions of a conductive shaft of the roller. In the state the roller was rotated at 0.5 Hz (cycle/second), a voltage of 1,000 V was applied across the conductive shaft and the drum made of aluminum, and its electric-current value in each of environments of 10° C./15% RH (L/L), 23° C./55% RH (N/N) and 35° C./95% RH (H/H) was measured, where the resistivity of the roller was calculated by the Ohm's law. Also, the resistivity in L/L thus measured was divided by the resistivity in H/H, and the value found was logarithmically converted, and expressed as the difference in power (exponent) of environmental variations. In the present Examples and Comparative Examples, the difference in power of environmental variations in resistivity was evaluated according to the following evaluation criteria.

AA: The difference in power of environmental variations is 1.3 or less (very small environmental dependence).

A: The difference in power of environmental variations is from more than 1.3 to 1.8 or less (small environmental dependence).

B: The difference in power of environmental variations is from more than 1.8 to 2.0 or less (medium environmental dependence).

C: The difference in power of environmental variations is more than 2.0 (large environmental dependence).

—Roller Electrification Durability Test—

Firstly, according to the measurement of roller resistivity above, the resistivity of the conductive rubber roller in an environment of 23° C./55% RH (N/N) was measured, and the resistivity measured was defined as the resistivity of the roller before the durability test.

Next, the conductive rubber roller was placed in an environment of 50° C., and was brought into pressure contact with a drum of 30 mm in diameter and made of aluminum, in such a way that a load of 4.9 N on each side was applied to the both end portions of the shaft of the roller. In the state the roller was rotated at 0.2 Hz, a constant current of 80 μA was continued to be applied across the shaft and the aluminum drum for 25 hours. Thereafter the roller resistivity was again measured in an environment of 23° C./55% RH (N/N) to obtain the roller resistivity after the durability test. Here, the resistivity after the durability test was divided by the resistivity before the durability test, and the value found was logarithmically converted, and expressed as the difference in power of durability. The smaller this is, the better electrification durability the conductive rubber roller can be said to have. In the present Examples and Comparative Examples, the electrification durability was evaluated as the difference in power of durability variations, according to the following evaluation criteria.

A: The difference in power of durability variations is 0.35 or less (good durability).

C: The difference in power of durability variations is more than 0.35 (poor durability).

—Resistivity Lowering Effect—

The conductive rubber rollers produced were each brought into pressure contact with a drum of 30 mm in outer diameter and made of aluminum, in such a way that a load of 4.9 N on each side was applied to the both end portions of the conductive shaft of the roller. In the state the roller was rotated at 0.5 Hz, a voltage of 1,000 V was applied across the conductive shaft and the drum made of aluminum, and its electric-current value in an environment of 23° C./55% RH (N/N) was measured, where the resistivity of the roller was calculated by the Ohm's law. In the present Examples and Comparative Examples, the effect of lowering the resistivity was evaluated by comparing it with that of Comparative Example 1-6, in which the ethylene oxide-propylene oxide-allyl glycidyl ether terpolymer was not contained and the rubber component was the acrylonitrile-butadiene rubber (NBR) alone.

Evaluation criteria are as shown below. Here, the difference in power of resistivity variations is the value found when the resistivity of each of the conductive rubber rollers obtained in Examples and Comparative Example was divided by the resistivity of Comparative Example 1-6, and the value found was logarithmically converted.

A: The difference in power of resistivity variations is −1.0 or less (large lowering effect).

C: The difference in power of resistivity variations is more than −1.0 (small lowering effect).

—Electrophotographic Photosensitive Member (Photosensitive Drum) Contamination—

The conductive rubber rollers were each brought into contact with an electrostatic photosensitive member used in a laser printer LASER JET 4000N, manufactured by Hewlett-Packard Co. A load of 1,000 g was applied to both end portions of the conductive shaft of the roller, and this was left for a day in an environment of 40° C./95% RH. After leaving, the load was removed, and any deposits on the electrostatic photosensitive member were examined on a microscope. Thereafter, the electrostatic photosensitive member used was set in the cartridge of the printer, and solid-black images were printed on 30 sheets. The images formed were visually evaluated. A case in which no deposit is seen on the electrostatic photosensitive member and also the images formed were good was evaluated as "A"; and a case in which deposits are seen, though slightly, on the electrostatic photosensitive member but the images formed were tolerable in practical use, as "B". A case in which deposits are seen on the electrostatic photosensitive member and the images formed were intolerable in practical use was evaluated as "C".

—Roller Resistivity Non-Uniformity—

The conductive rubber rollers produced were each brought into pressure contact with a drum of 30 mm in outer diameter and made of aluminum, in such a way that a load of 4.9 N each was applied to the both end portions of the conductive shaft of the roller. In the state the roller was rotated at 0.5 Hz, a voltage of 1,000 V was applied across the conductive shaft and the drum made of aluminum. The difference in resistivity between a maximum value and a minimum value is determined to regard it as an index of resistivity scattering. Also, evaluation was made according to the following evaluation criteria.

A: The measured value is 1.1 or less (very small roller resistivity non-uniformity).

B: The measured value is from more than 1.1 to 1.2 or less (small roller resistivity non-uniformity).

C: The measured value is 1.2 or more (large roller resistivity non-uniformity).

Example 1-1 and Comparative Examples 1-1 to 1-6

Test results obtained are shown together in Table 1.

As shown in Table 1, it is seen from Example 1-1 and Comparative Examples 1-1 to 1-5 that the ethylene oxide-propylene oxide-allyl glycidyl ether terpolymer is suitable when it is within the range of what is required in the present invention. More specifically, in Comparative Example 1-1, in which the melt peak temperature is higher and the melt enthalpy change ΔH is larger than those within the ranges of the present invention and the allyl glycidyl ether is in a smaller copolymerization ratio than that within the range of the present invention, the ethylene oxide has so high crystallizability as to bring a small effect of lowering the resistivity. Also, since the allyl glycidyl ether is in a small copolymerization ratio, the roller obtained has a large environmental dependence and an inferior photosensitive member anti-contamination. Also, in Comparative Example 1-2, in which the melt peak temperature is lower and the melt enthalpy change ΔH is smaller than those within the ranges of the present invention and the allyl glycidyl ether is in a larger copolymerization ratio than that within the range of the present invention, the cross-linking sites attributable to the allyl glycidyl ether roller obtained are so many that the roller obtained has a small environmental dependence and a good photosensitive member anti-contamination, but brings a small effect of lowering the resistivity. Further, even though the allyl glycidyl ether is in a copolymerization ratio within that in the present invention, in Comparative Example 1-3, in which the melt peak temperature is lower and the melt enthalpy change ΔH is smaller than those within the ranges of the present invention, the roller obtained has no sufficiently small environmental dependence and also brings an insufficient effect of lowering the resistivity, and, in Comparative Example 1-4, in which the melt peak temperature is higher and the melt enthalpy change ΔH is larger than those within the ranges of the present invention, the roller obtained brings no sufficient effect of lowering the resistivity. Also, even though the melt peak temperature and melt enthalpy change ΔH are within the ranges of the present invention, in Comparative Example 1-5, in which the allyl glycidyl ether is in a copolymerization ratio outside the range of the present invention, the roller obtained has a large environmental dependence and an inferior photosensitive member anti-contamination.

On the other hand, in Example 1-1, which is within the range of the present invention, the roller obtained has a small environmental dependence and a good photosensitive member anti-contamination while retaining a good electrification durability. Further, the resistivity is effectively made low.

TABLE 1

| | Melt peak temp. | Melt enthalpy change ΔH | Example | Comparative Example | | | | | |
|---|---|---|---|---|---|---|---|---|---|
| | (° C.) | (mJ/mg) | 1-1 | 1-1 | 1-2 | 1-3 | 1-4 | 1-5 | 1-6 |
| Acrylonitrile-butadiene rubber: | | | 80 | 80 | 80 | 80 | 80 | 80 | 100 |
| Ethylene oxide-propylene oxide-allyl glycidyl ether terpolymer: Copolymerization ratio (mol %): | | | | | | | | | |
| 87:1:12 | 24.4 | 52.8 | 20 | — | — | — | — | — | — |
| 94:2:4 | 36.8 | 79.1 | — | 20 | — | — | — | — | — |
| 77:0.5:22.5 | 19.5 | 39.5 | — | — | 20 | — | — | — | — |
| 74:12:44 | 19.1 | 38.9 | — | — | — | 20— | — | — | — |
| 89:0.5:10.5 | 30.4 | 71.2 | — | — | — | — | 20 | — | — |
| 87:4:9 | 25.8 | 57.5 | — | — | — | — | — | 20 | — |
| Zinc oxide: | | | 5 | 5 | 5 | 5 | 5 | 5 | 5 |
| Stearic acid: | | | 1 | 1 | 1 | 1 | 1 | 1 | 1 |
| Carbon black A: | | | 20 | 20 | 20 | 20 | 20 | 20 | 20 |
| Calcium carbonate: | | | 50 | 50 | 50 | 50 | 50 | 50 | 50 |
| DM: | | | 1 | 1 | 1 | 1 | 1 | 1 | 1 |
| TET: | | | 2 | 2 | 2 | 2 | 2 | 2 | 2 |
| Sulfur: | | | 1.5 | 1.5 | 1.5 | 1.5 | 1.5 | 1.5 | 1.5 |
| Azodicarbonamide: | | | 4 | 4 | 4 | 4 | 4 | 4 | 4 |
| Urea: | | | 2 | 2 | 2 | 2 | 2 | 2 | 2 |
| Roller resistivity (Ω): | | | | | | | | | |
| L/L environment | | | $1.7 \times 10^8$ | $4.2 \times 10^8$ | $3.4 \times 10^8$ | $5.7 \times 10^8$ | $3.6 \times 10^8$ | $1.9 \times 10^8$ | — |
| N/N environment | | | $2.0 \times 10^7$ | $8.2 \times 10^7$ | $7.7 \times 10^7$ | $6.2 \times 10^7$ | $6.8 \times 10^7$ | $1.9 \times 10^7$ | $3.7 \times 10^8$ |
| H/H environment | | | $3.5 \times 10^6$ | $6.4 \times 10^6$ | $6.5 \times 10^6$ | $4.8 \times 10^6$ | $7.5 \times 10^6$ | $1.7 \times 10^6$ | — |
| Before durability test | | | $2.0 \times 10^7$ | $8.2 \times 10^7$ | $7.7 \times 10^7$ | $6.2 \times 10^7$ | $6.8 \times 10^7$ | $1.9 \times 10^7$ | — |
| After durability test | | | $4.2 \times 10^7$ | $1.5 \times 10^8$ | $1.5 \times 10^8$ | $1.1 \times 10^8$ | $1.3 \times 10^8$ | $3.8 \times 10^7$ | — |
| Environmental variation difference in power: | | | | | | | | | |
| L/L − N/N | | | 0.93 | 0.71 | 0.64 | 0.96 | 0.72 | 0.99 | — |
| N/N − H/H | | | 0.76 | 1.11 | 1.07 | 1.11 | 0.96 | 1.05 | — |
| L/L − H/H | | | 1.69 | 1.83 | 1.71 | 2.07 | 1.68 | 2.04 | — |
| Durability variation difference in power: | | | 0.32 | 0.26 | 0.29 | 0.25 | 0.28 | 0.30 | — |
| Resistivity variation difference in power: | | | −1.26 | −0.65 | −0.68 | −0.77 | −0.73 | −1.29 | — |
| Resistivity lowering effect: | | | A | C | C | C | C | A | — |
| Environmental dependence: | | | A | B | A | C | A | C | — |
| Electrification durability: | | | A | A | A | A | A | A | — |
| Photosensitive member anti-contamination: | | | A | C | A | A | A | C | — |

Examples 2-1 to 2-4 and Comparative Example 2-1

Test results obtained are shown together in Table 2.

As shown in Table 2, it is seen from Examples 2-1 to 2-4 that that the amount in which the ethylene oxide-propylene oxide-allyl glycidyl ether terpolymer used in the present invention is to be mixed is preferably from 5 to 20 parts by mass. More specifically, in Example 2-4, in which it is mixed in an amount of more than 20 parts by mass, the conductive rubber roller obtained shows a large environmental dependence.

It is also seen that, in contrast with Example 2-3, Comparative Example 2-1, which is a conductive rubber roller whose electrical resistance has been controlled using only the acrylonitrile-butadiene rubber and epichlorohydrin type rubber without mixing any ethylene oxide-propylene oxide-allyl glycidyl ether terpolymer, shows electrification durability which is inferior to that of Example 2-3, in which the ethylene oxide-propylene oxide-allyl glycidyl ether terpolymer according to the present invention is mixed.

TABLE 2

| | Melt peak temp. (° C.) | Melt enthalpy change ΔH (mJ/mg) | Example 2-1 | Example 2-2 | Example 2-3 | Example 2-4 | Comparative Example 2-1 |
|---|---|---|---|---|---|---|---|
| Acrylonitrile-butadiene rubber: | | | 95 | 90 | 80 | 75 | 80 |
| Epichlorohydrin type rubber: | | | — | — | 10 | — | 20 |
| Ethylene oxide-propylene oxide-allyl glycidyl ether terpolymer: Copolymerization ratio (mol %): | | | | | | | |
| 87:1:12 | 24.4 | 52.8 | 5 | 10 | 10 | 25 | — |
| Zinc oxide: | | | 5 | 5 | 5 | 5 | 5 |
| Stearic acid: | | | 1 | 1 | 1 | 1 | 1 |
| Carbon black A: | | | 20 | 20 | 20 | 20 | 20 |
| Calcium carbonate: | | | 50 | 50 | 50 | 50 | 50 |
| DM: | | | 1 | 1 | 1 | 1 | 1 |
| TET: | | | 2 | 2 | 2 | 2 | 2 |
| Sulfur: | | | 1.5 | 1.5 | 1.5 | 1.5 | 1.5 |
| Azodicarbonamide: | | | 4 | 4 | 4 | 4 | 4 |
| Urea: | | | 2 | 2 | 2 | 2 | 2 |
| Roller resistivity (Ω): | | | | | | | |
| L/L environment | | | $5.9 \times 10^{9}$ | $1.1 \times 10^{9}$ | $4.0 \times 10^{8}$ | $6.0 \times 10^{8}$ | $5.8 \times 10^{8}$ |
| N/N environment | | | $1.7 \times 10^{9}$ | $2.7 \times 10^{8}$ | $1.2 \times 10^{8}$ | $7.5 \times 10^{7}$ | $1.2 \times 10^{8}$ |
| H/H environment | | | $5.5 \times 10^{8}$ | $1.0 \times 10^{8}$ | $3.2 \times 10^{7}$ | $6.1 \times 10^{6}$ | $2.8 \times 10^{7}$ |
| Before durability test | | | $1.7 \times 10^{9}$ | $2.7 \times 10^{8}$ | $1.2 \times 10^{8}$ | $7.5 \times 10^{7}$ | $1.2 \times 10^{8}$ |
| After durability test | | | $3.4 \times 10^{9}$ | $5.2 \times 10^{8}$ | $2.4 \times 10^{8}$ | $1.5 \times 10^{7}$ | $3.8 \times 10^{8}$ |
| Environmental variation difference in power: | | | | | | | |
| L/L − N/N | | | 0.54 | 0.61 | 0.52 | 0.90 | 0.68 |
| N/N − H/H | | | 0.49 | 0.43 | 0.57 | 1.09 | 0.63 |
| L/L − H/H | | | 1.03 | 1.04 | 1.09 | 1.99 | 1.31 |
| Durability variation difference in power: | | | 0.30 | 0.28 | 0.30 | 0.30 | 0.50 |
| Environmental dependence: | | | AA | AA | AA | B | A |
| Electrification durability: | | | A | A | A | A | C |

Example 3-1 and Comparative Example 3-1

The test results obtained are shown together in Table 3.

As shown in Table 3, it is seen from Example 3-1 and Comparative Example 3-1 that it is more preferable for the rubber composition used in the present invention, to contain the ionic conducting agent. Example 3-1, which is the same as Example 1-1 except that the ionic conducting agent is mixed in an amount of 1 part by mass, is seen to have more effectively achieved the low resistivity while retaining the small environmental dependence achieved in Example 1-1. Also, there is seen no problem of photosensitive member contamination. In contrast thereto, in the case of Comparative Example 3-1, in which 1 part by mass of the ionic conducting agent is mixed in a rubber composition making use of an ethylene oxide-propylene oxide-allyl glycidyl ether terpolymer outside the range of the present invention, the effect of lowering the resistivity is insufficient, and besides the roller obtained has a large environmental dependence and further causes photosensitive member contamination.

TABLE 3

| | Melt peak temp. (° C.) | Melt enthalpy change ΔH (mJ/mg) | Example 3-1 | Comparative Example 3-1 |
|---|---|---|---|---|
| Acrylonitrile-butadiene rubber: | | | 80 | 80 |
| Epichlorohydrin type rubber: | | | — | — |
| Ethylene oxide-propylene oxide-allyl glycidyl ether terpolymer: Copolymerization ratio (mol %): | | | | |
| 87:1:12 | 24.4 | 52.8 | 20 | — |
| 90:4:6 | 34.1 | 78.3 | — | 20 |
| Zinc oxide: | | | 5 | 5 |
| Stearic acid: | | | 1 | 1 |
| Carbon black A: | | | 20 | 20 |
| Calcium carbonate: | | | 50 | 50 |
| Ionic conducting agent: | | | 1 | 1 |
| DM: | | | 1 | 1 |
| TET: | | | 2 | 2 |
| Sulfur: | | | 1.5 | 1.5 |
| Azodicarbonamide: | | | 4 | 4 |
| Urea: | | | 2 | 2 |

TABLE 3-continued

| | Melt peak temp. (° C.) | Melt enthalpy change ΔH (mJ/mg) | Example 3-1 | Comparative Example 3-1 |
|---|---|---|---|---|
| Roller resistivity (Ω): | | | | |
| L/L environment | | | $3.5 \times 10^7$ | $3.2 \times 10^8$ |
| N/N environment | | | $4.6 \times 10^6$ | $4.9 \times 10^7$ |
| H/H environment | | | $9.8 \times 10^5$ | $3.1 \times 10^6$ |
| Environmental variation difference in power: | | | | |
| L/L – N/N | | | 0.88 | 0.81 |
| N/N – H/H | | | 0.68 | 1.20 |
| L/L – H/H | | | 1.56 | 2.01 |
| Resistivity variation difference in power: | | | −1.90 | −0.87 |
| Resistivity lowering effect: | | | A | C |
| Environmental dependence: | | | A | C |
| Photosensitive member anti-contamination: | | | A | C |

Examples 4-1 to 4-5

The test results obtained are shown together in Table 4.

As shown in Table 4, it is seen from Examples 4-1 to 4-5 that it is preferable for the rubber composition used in the present invention, to make use of only carbon black as the filler, and, as the carbon black, to contain, based on 100 parts by mass of the total sum of the rubber components of the rubber composition, from 5 to 70 parts by mass of carbon black having an iodine adsorption of from 5 to 30 mg/g and a dibutyl phthalate (DBP) oil absorption of 55 ml/100 g or less.

It is also seen that Examples 4-2 and 4-3, which are cases in which only the carbon black having the iodine adsorption and dibutyl phthalate (DBP) oil absorption of within the above ranges is used as the filler, each show a smaller environmental dependence than Example 4-1, in which calcium carbonate is used as the filler. Also, Example 4-4, in which the iodine adsorption and dibutyl phthalate (DBP) oil absorption are larger than those within the above ranges, and, even where the iodine adsorption and dibutyl phthalate (DBP) oil absorption are within the above ranges, Example 4-5, in which the carbon black is mixed in an amount of 75 parts by mass, each show a small environmental dependence but tend to show a large roller resistivity non-uniformity.

TABLE 4

| | Melt peak temp. (° C.) | Melt enthalpy change ΔH (mJ/mg) | Example 4-1 | 4-2 | 4-3 | 4-4 | 4-5 |
|---|---|---|---|---|---|---|---|
| Acrylonitrile-butadiene rubber: | | | 80 | 80 | 80 | 80 | 80 |
| Ethylene oxide-propylene oxide-allyl glycidyl ether terpolymer: Copolymerization ratio (mol %): | | | | | | | |
| 87:1:12 | 24.4 | 52.8 | 20 | 20 | 20 | 20 | 20 |
| Zinc oxide: | | | 5 | 5 | 5 | 5 | 5 |
| Stearic acid: | | | 1 | 1 | 1 | 1 | 1 |
| Carbon black A: | | | 5 | 30 | — | — | 75 |
| Carbon black B: | | | — | — | 30 | — | — |
| Carbon black C: | | | — | — | — | 30 | — |
| Calcium carbonate: | | | 50 | — | — | — | — |
| DM: | | | 1 | 1 | 1 | 1 | 1 |
| TET: | | | 2 | 2 | 2 | 2 | 2 |
| Sulfur: | | | 1.5 | 1.5 | 1.5 | 1.5 | 1.5 |
| Azodicarbonamide: | | | 4 | 4 | 4 | 4 | 4 |
| Urea: | | | 2 | 2 | 2 | 2 | 2 |
| Roller resistivity (Ω): | | | | | | | |
| L/L environment | | | $1.9 \times 10^8$ | $9.0 \times 10^7$ | $9.5 \times 10^7$ | $9.1 \times 10^7$ | $4.8 \times 10^7$ |
| N/N environment | | | $3.0 \times 10^7$ | $2.1 \times 10^7$ | $2.3 \times 10^7$ | $1.6 \times 10^7$ | $1.1 \times 10^7$ |
| H/H environment | | | $4.5 \times 10^6$ | $6.0 \times 10^6$ | $6.5 \times 10^6$ | $5.2 \times 10^6$ | $5.3 \times 10^6$ |
| Roller resistivity non-uniformity: | | | | | | | |
| N/N environment | | | 1.07 | 1.08 | 1.06 | 1.15 | 1.18 |
| Environmental variation difference in power: | | | | | | | |
| L/L – N/N | | | 0.80 | 0.63 | 0.62 | 0.75 | 0.64 |
| N/N – H/H | | | 0.82 | 0.54 | 0.55 | 0.49 | 0.32 |
| L/L – H/H | | | 1.62 | 1.17 | 1.17 | 1.24 | 0.96 |

TABLE 4-continued

| | Melt peak temp. (° C.) | Melt enthalpy change ΔH (mJ/mg) | Example 4-1 | 4-2 | 4-3 | 4-4 | 4-5 |
|---|---|---|---|---|---|---|---|
| Environmental dependence: | | | A | AA | AA | AA | AA |
| Roller resistivity non-uniformity: | | | A | A | A | B | B |

As described above, it is seen that the conductive rubber roller of the present invention has a small environmental dependence of resistivity, also has a superior electrification durability, further has a low electrical resistance and has kept the electrostatic photosensitive member contamination from occurring.

This application claims priority from Japanese Patent Application Nos. 2005-136055 filed May 9, 2005, 2005-136056 filed May 9, 2005, 2005-136057 filed May 9, 2005, 2005-136058 filed May 9, 2005, 2005-136059 filed May 9, 2005 and 2006-114434 filed Apr. 18, 2006, which are hereby incorporated by reference herein.

What is claimed is:

1. A conductive rubber roller comprising a conductive core material and provided thereon a rubber layer;

said rubber layer being formed by using a rubber composition containing as rubber components at least a polar rubber and an ethylene oxide-propylene oxide-allyl glycidyl ether terpolymer;

said ethylene oxide-propylene oxide-allyl glycidyl ether terpolymer having a melt peak temperature of 20° C. or higher and 30° C. or lower and a melt enthalpy change ΔH of 40 mJ/mg or more and 70 mJ/mg or less as measured with a differential scanning calorimeter; and the allyl glycidyl ether in said ethylene oxide-propylene oxide-allyl glycidyl ether terpolymer being in a copolymerization ratio of from more than 10 mol % to 20 mol % or less.

2. The conductive rubber roller according to claim 1, wherein, where the copolymerization ratios of the propylene oxide and allyl glycidyl ether in said ethylene oxide-propylene oxide-allyl glycidyl ether terpolymer are represented by a and b (mol %), respectively, $10<a+b\leqq 30$ $(10<b\leqq 20)$.

3. The conductive rubber roller according to claim 1, wherein said rubber composition further contains an ionic conducting agent in an amount of 0.1 part by mass or more and 10 parts by mass or less based on 100 parts by mass of the rubber components.

4. The conductive rubber roller according to claim 1, which comprises said rubber composition, which contains, based on 100 parts by mass of the total sum of the rubber components of the rubber composition, 5 parts by mass or more and 70 parts by mass or less of carbon black having an iodine adsorption of 5 mg/g or more and 30 mg/g or less and a dibutyl phthalate (DBP) oil absorption of 55 ml/100 g or less.

5. The conductive rubber roller according to claim 1, wherein said ethylene oxide-propylene oxide-allyl glycidyl ether terpolymer is mixed in an amount of 5 parts by mass or more and 20 parts by mass or less based on 100 parts by mass of the total sum of the rubber components of said rubber composition.

6. The conductive rubber roller according to claim 1, wherein said polar rubber is any one, or both, of acrylonitrile-butadiene rubber and epichlorohydrin rubber.

7. The conductive rubber roller according to claim 1, which is used in an image forming apparatus in which an electrostatic latent image formed on an electrostatic photosensitive member is developed with a developer, wherein said conductive rubber roller is a transfer roller which is face to face disposed on the electrostatic photosensitive member.

* * * * *